No. 674,907. Patented May 28, 1901.
G. W. DOWELL.
STEW PAN.
(Application filed Feb. 25, 1901.)
(No Model.)

Witnesses
G. W. Dowell, Inventor.
Attorneys

UNITED STATES PATENT OFFICE.

GEORGE W. DOWELL, OF ATHENS, TEXAS.

STEW-PAN.

SPECIFICATION forming part of Letters Patent No. 674,907, dated May 28, 1901.

Application filed February 25, 1901. Serial No. 48,840. (No model.)

*To all whom it may concern:*

Be it known that I, GEORGE W. DOWELL, a citizen of the United States, residing at Athens, in the county of Henderson and State of Texas, have invented a new and useful Stew-Pan, of which the following is a specification.

This invention relates to a stew-pan and means for heating the same; and the object of the present improvement is to provide a simple and effective construction whereby a number of different kinds of meat or other eatables may be cooked or stewed in one enlarged receptacle which forms the top covering for and is directly influenced by the fire of a heater, and thereby facilitate the cooking of large quantities of meats or vegetables for restaurants, hotels, armies, camping parties, and the like.

The invention consists in the construction and arrangement of the several parts, which will be more fully hereinafter described and claimed.

Figure 1:
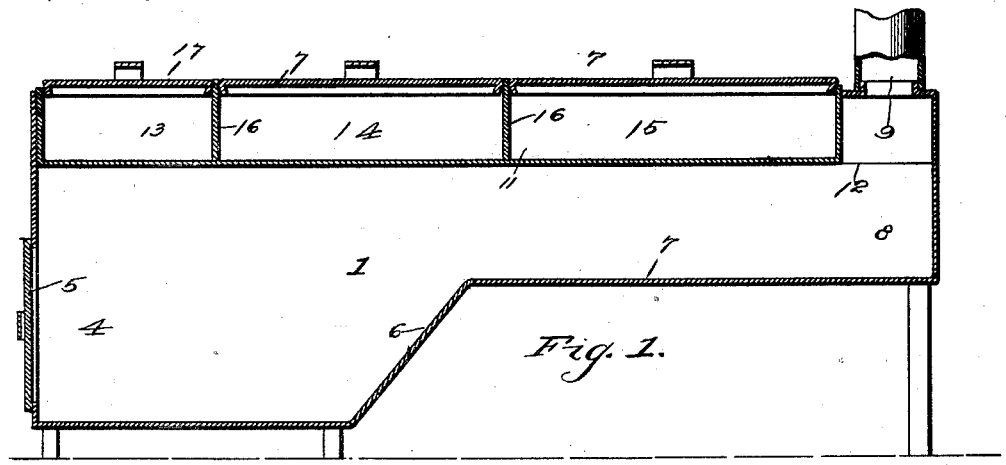
Figure 2:
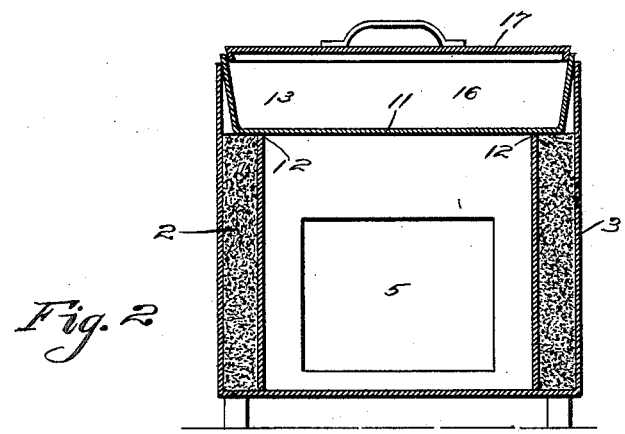
Figure 3:
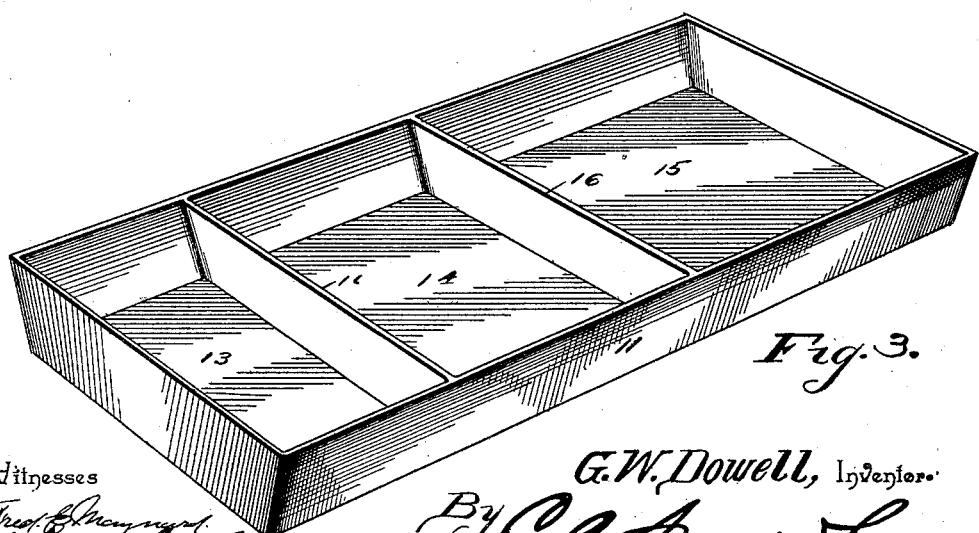

In the drawings, Figure 1 is a longitudinal vertical section of a combined heater and stew-pan embodying the features of the invention. Fig. 2 is a transverse vertical section of the same. Fig. 3 is a detail perspective view of the pan.

Similar numerals of reference are employed to indicate corresponding parts in the several views.

The numeral 1 designates a heater of suitable length and width and constructed, preferably, of light metal adapted for the purpose. At the opposite sides are double walls 2 and 3, with a space between them, which is filled in each instance with concrete or sand to give it a good body. The fire-box 4 is at the front end of the heater and is supplied with a communicating door 5 for the obvious purpose of introducing fuel and removing ashes. From the rear of the said fire-box the bottom of the heater takes an upward and rearward inclination, as at 6, and then continues into a horizontal member 7 to the rear end 8 in closer relation to the top of the heater, and in the rear portion of the top is an outlet-opening 9 for smoke and the like, which passes off through a suitable smoke-pipe 10. The entire top portion of the heater is open except at the rear extremity, in which the opening 9 is formed, and to provide a cover for the said open top of the heater a stew-pan 11 of elongated form is employed and extends downwardly into the heater and rests on the shoulders 12, formed by the upper terminals of the double walls at the sides of the heater. The pan 11 is removable at will, and in its construction the opposite sides are inclined, and it is divided into three separate compartments 13, 14, and 15 by intermediate partitions 16, extending transversely thereof, the said compartments being of different sizes to vary the containing capacities of the same, and each compartment is provided with a close-fitting removable lid or cover 17 to retain the steam and vapors in the compartments and retain the flavor of the articles in said compartments. It will be observed that the heat is caused to act on the pan-bottom equally throughout the length of the latter by constructing the bottom of the heater at the rear, as heretofore set forth, and by having the pan freely removable from the heater and serving as the exclusive top cover for the same when applied the pan can be easily cleansed as well as the interior of the heater. The heater, as shown, is of a portable character; but in some instances it may be similarly constructed of brick or other analogous material for stationary purposes.

In the use of the improved device water is first placed in the compartments of the pan and a fire started in the heater to cause the water to boil. While the water is boiling the articles or materials to be cooked are placed in the same and covered with the lids, seasoning being added as desired and in accordance with the character of the materials being cooked.

The pan is adapted for cooking all kinds of materials, but is particularly intended for cooking meats and to preserve the flavor of the latter. Large quantities of meat can be cooked at one time and be of a different nature in the separate compartments, thereby providing for a large service without using separate cooking utensils and accommodating a large concourse of people, as in restaurants and other like gatherings.

The improved device is simple in construction and inexpensive in manufacture.

By having the compartments in the pan of different dimensions smaller quantities of meat or other material that may be required of a certain kind can be cooked in the reduced compartments and condense the flavor by avoiding the use of an overamount of water to absorb and take up the essence and adulterate the latter to such an extent as to injure the meat itself, it being seen that the larger the compartment the more water will be required to cover the bottom of the same to prevent burning or scorching and injury to the meat cooked therein.

Having thus described the invention, what is claimed as new is—

The combination of a heater of the class set forth having a bottom forming a portion of the fire-box at the front and at the rear terminal of said box extending upwardly and rearwardly at an angle of inclination and continuing into a rear horizontal portion which is closer to the top of the heater, the top portion of the heater being almost completely open and the opposite sides in the form of double filled walls which provide upper shoulders below the top edge, and an elongated stew-pan closure for the said open top of the heater, the said pan being freely removable and provided with a plurality of compartments of different dimensions extending the full transverse width of the same and individually provided with removable lids.

In testimony that I claim the foregoing as my own I have hereto affixed my signature in the presence of two witnesses.

GEORGE W. DOWELL.

Witnesses:
  EARL JONES,
  R. E. YANTIS.